E. BREITINGER.
DAMPING DEVICE FOR MEASURING INSTRUMENTS AND THE LIKE.
APPLICATION FILED FEB. 14, 1913.
1,214,507.
Patented Feb. 6, 1917.
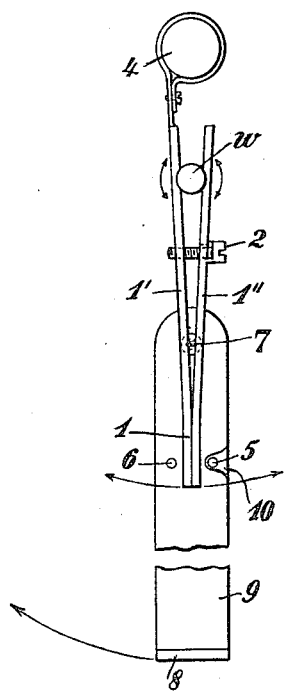
Fig. 1.
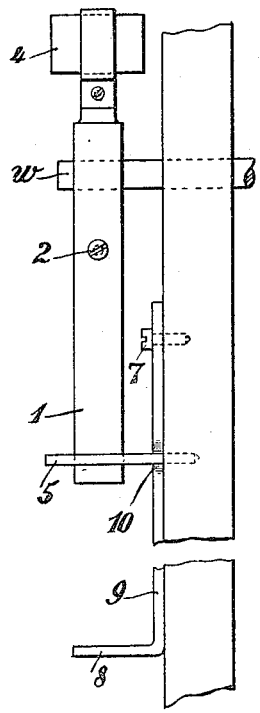
Fig. 2.
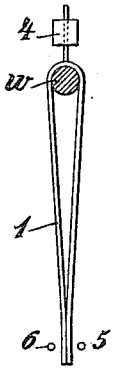
Fig. 4.
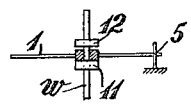
Fig. 5.
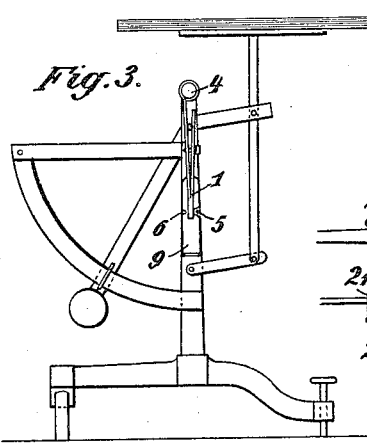
Fig. 3.
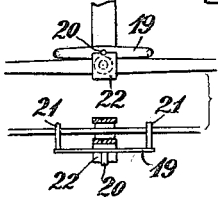
Fig. 7.
Fig. 8.
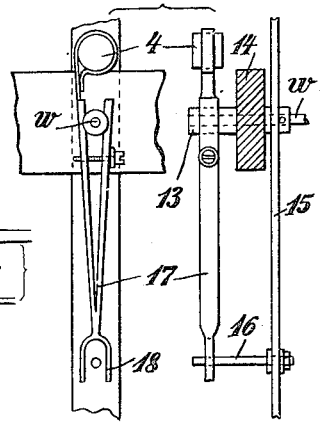
Fig. 6.
E. G. McCarthy.
P. H. Ross
Eduard Breitinger
by
Bakewell, Byrnes and Parmelee

UNITED STATES PATENT OFFICE.

EDUARD BREITINGER, OF ALBISRIEDEN, SWITZERLAND.

DAMPING DEVICE FOR MEASURING INSTRUMENTS AND THE LIKE.

1,214,507. Specification of Letters Patent. Patented Feb. 6, 1917.

Application filed February 14, 1913. Serial No. 748,392.

*To all whom it may concern:*

Be it known that I, EDUARD BREITINGER, student, a citizen of Switzerland, residing at Albisriederstrasse 385, Albisrieden, near Zurich, Switzerland, have invented new and useful Improvements in Damping Devices for Measuring Instruments and the like, of which the following is a specification.

The present invention relates to improvements in damping devices for measuring instruments, such as volt-meters, balances, scales and the like. In such instruments the pointer or indicating part does not at once assume the final position corresponding to the measure to be indicated, but as a rule swings beyond that position and performs several oscillations before it comes to rest.

The damping device forming the subject of the present invention consists of a frictional brake which is actuated by any except the last few oscillations of a moving part of the measuring device, so that the first large oscillations are damped while the last small oscillations remain uninfluenced by the damping device. In this manner a very rapid and effective damping action is obtained, which damping action nevertheless allows an accurate indication of the measure as the moving part is free from the action of the brake immediately before assuming its final position of rest. The moving part actuating the brake is so coupled with the brake that it can only perform a very small movement in either direction without moving the brake.

The accompanying drawings illustrate by way of example five measuring instruments constructed according to the present invention.

Figures 1 and 2 are front and side elevations of the first construction, and Fig. 3 shows the application of this construction to a letter scale. Figs. 4 and 5 show a modified construction, especially suitable for very fine instruments, and Fig. 6 shows in front and side elevation a modified construction wherein the shaft is damped indirectly. Fig. 7 shows in front elevation of another modified construction applied to a beam balance, and Fig. 8 is a plan view thereof.

The automatic damping device shown in Figs. 1 and 2 comprises a lever 1 which consists of two relatively movable arms 1' and 1'' which embrace the shaft $w$ and are clamped together by means of a set screw 2, the clamping being carried only to such an extent as to allow the shaft to move with more or less freedom between the two clamping jaws. Upon the free end of the arm 1' is fixed a counter-weight 4 by means of which the whole lever 1 is balanced. The lower end of the lever 1 moves between two stops 5 and 6, one of which, for instance the stop 5, is stationary while the stop 6 is mounted upon a plate or carrier 9 adapted to swing about the pivot 7 and provided with a handle 8. The plate or support 9 is formed with a recess 10 through which the stop 5 projects and limits the relative movement of the stop 6 with regard to the stop 5 in one direction.

The operation of the damping device above described is as follows: If the shaft $w$ is set into motion by a lever secured thereto or by a wheel or any other device, it assumes a movement of oscillation which is communicated to the lever 1, which latter therefore receives also an oscillating motion. As the lever 1 can move in both directions only as far as the stop 5 or stop 6 permits, it will remain at rest from the moment of striking the stop until the shaft $w$ has completed its oscillation in the corresponding direction. When the shaft $w$ swings back it carries with it the lever 1, and causes it to strike the other stop, whereupon the lever is again retained in its position of rest until the direction of movement of the shaft is reversed. During the time when the lever 1 is at rest, the shaft $w$ turns between the two clamping arms 1' and 1'' whereby friction is produced between the shaft and the levers, which friction has a braking effect upon the shaft, and causes the oscillation thereof to be damped. The shaft therefore quickly comes to rest, and it will be noted that the last small oscillations of the shaft during which the end of the lever 1 does not come into contact with the stops, will not be influenced by the lever at all. The braking action of the lever is therefore limited to the first big oscillations of the shaft.

By means of the set screw 2, the force of the braking or damping effect may be regulated. By altering the distance between the stop 6 and the stop 5, the braking action may be retarded as the lever 1 will be allowed a large oscillation to one side if the distance be increased, during which there will be no braking action. If desired the stop 6 might be entirely removed and the device partly or entirely brought out of action.

The described damping device is particularly suitable for weighing machines and measuring instruments in which a pointer coöperating with a suitably divided scale indicates the result of the measure or the weighing apparatus, and in which the pointer or the scale are performing a movement. The damping device reduces the number of oscillations of the oscillating part and brings the same within a very short time into the position in which the result of the measuring operation may be read off.

Fig. 3 illustrates the application of the damping device to a letter scale. Experiments have shown that even when the first oscillation of the weight lever is very large the position of rest is assumed after three or four oscillations, whereas if no damping device is used, there will be usually about 15 to 20 oscillations before the lever comes to rest. When a damping device of the improved kind is used, it is not necessary to obtain the damping of the scale by hand manipulation.

Fig. 4 shows a construction of the damping device which is particularly suitable for very fine sensitive measuring instruments. The braking member 1 is made here in the form of an elongated loop, the semi-circular bent portion of which rests upon the shaft $w$. To this portion may be fixed a counterweight 4. The narrow part of the lever 1 works between two stops 5 and 6. The braking action of the lever during the periods of rest in which it abuts against one or the other stop, is determined only by its own weight. The braking action is therefore very gentle.

Fig. 5 shows a construction also suitable for very fine instruments in which the braking member 1 which is properly balanced, is loosely arranged upon the shaft $w$ to be braked. The longitudinal displacement of the braking member may be limited by two collars 11 and 12 arranged upon the shaft $w$. The braking action of the braking member is also produced in this case only by the weight of the braking member which acts upon the lower collar 11. If necessary, the friction may be increased by employing a spring acting upon the braking member. The oscillation of the braking member 1 may be limited by two stops 5 and 6 of which only stop 5 is shown in the drawings. One of the stops might be arranged to be movable about the axis of the shaft $w$, so as to be adjustable with regard to the other stop for the purpose of regulating the damping action or entirely throwing out of action the damping device.

In the construction shown in Fig. 6, the shaft $w$ is braked indirectly. The shaft is mounted revolubly in a bearing piece 14 provided with a tubular extension or nave 13. The oscillating member 15, which may be the pointer or the support of the oscillating scale, is secured to the shaft $w$ and carries a projection or pin 16. Upon the tubular portion 13 is clamped a lever 17 provided with suitable clamping jaws and formed at its free lower end with a fork 18 into which engages a pin or projection 16. The braking is in this case obtained by the fact that during the first oscillations of the part 15, the lever 17 is carried in the one or the other direction and is caused to return upon the stationary portion 13. The friction produced between the stationary portion 13 and the clamping jaws of the lever causes the swinging part 15 to be quickly returned to its position of rest. The last small oscillations of the part 15 are not affected by the lever 1. If desired the axis of rotation of the lever 17 might be different from that of the shaft $w$.

The construction shown in Fig. 7 might be used for the balances commonly known under the name "beam balances," and is particularly suitable for very fine measurements. The device consists of a balanced lever 19 adapted to turn with the shaft 20 and limited in its movement by two stop pins 21, 21 parallel to the shaft 20. The lever 19 may be mounted upon a bearing 22 secured to the support of the scale beam, in such a manner that the stops 21 project into the path of the scale beam, but do not touch the scale beam when the latter is in its position of rest.

During the oscillation of the scale beam, the stop pins 21 are alternately struck by the arms of the scale beam and the lever 19 is therefore oscillated, the friction of the shaft 20 in its bearing producing the required braking effect, and causing a damping of the movement of the scale beam so long as the latter during its oscillation strikes the stops of the braking member. Very soon the oscillations of the scale beam are reduced to such an extent that the stops are no longer struck, whereupon the further movement of the scale beam remains unaffected by the braking device.

I claim:

1. The combination with a measuring instrument comprising a swinging registering member, which is arranged to swing back and forth over the point of registration before coming to a state of rest, of a resisting device comprising a balanced two-armed lever frictionally mounted on the indicating instrument, and means for oscillating said lever in both directions by means of the registering member, there being lost motion in said actuating means to permit the registering member to swing back and forth over the point of registration without moving said frictionally mounted lever, substantially as described.

2. The combination with an indicating instrument having a shaft, a registering member connected to said shaft, said registering member being arranged to swing back and forth over the point of registration by the momentum thereof, of a resisting device comprising a balanced two-armed member frictionally mounted on said shaft, means for causing said lever to oscillate with the registering member, said means being arranged to permit the registering member to swing back and forth over the point of indication a predetermined distance without moving the two-armed lever, substantially as described.

3. The combination with a measuring instrument comprising an indicating member adapted to swing beyond the point corresponding to the measure to be indicated and perform several oscillations before it comes to rest, of a resisting device comprising a frictionally mounted balanced two-armed lever, means for oscillating said lever when the indicating member is oscillated, substantially as described.

4. The combination with a measuring instrument comprising an indicating member adapted to swing beyond the point corresponding to the measure to be indicated and perform several oscillations before it comes to rest, a shaft for said member, of a resisting device comprising a two-armed lever whereof the arms are splayed and are adapted to embrace the shaft of the oscillating body, balancing means for said lever, and means for limiting the large oscillations of said lever, substantially as described.

5. A resisting device for measuring instruments and the like, comprising a balanced lever arranged to coact with the moving member of a measuring instrument, frictional means for causing the resisting device to move with the movable member of the measuring instrument, and a stop for the resisting device for determining its movement with the movable member of the measuring instrument; substantially as described.

6. A resisting device for measuring instruments and the like, comprising a balanced lever arranged to coact with the moving member of a measuring instrument, frictional means for causing the resisting device to move with the movable member of the measuring instrument, and stop devices for preventing the resisting device from moving beyond a predetermined position in either direction; substantially as described.

In testimony whereof I have signed my name to this specification in the presence of two subscribing witnesses.

EDUARD BREITINGER.

Witnesses:
CONRAD BOLTSHAUSER,
CARL GUBLER.

Copies of this patent may be obtained for five cents each, by addressing the "Commissioner of Patents, Washington, D. C."